United States Patent
Young et al.

(10) Patent No.: US 11,240,675 B2
(45) Date of Patent: Feb. 1, 2022

(54) METHOD AND SYSTEM FOR PLANNING AND OPERATING FIXED MICROWAVE COMMUNICATIONS SYSTEMS

(71) Applicant: CommScope Technologies LLC, Hickory, NC (US)

(72) Inventors: Peter S. Young, Herndon, VA (US); Joseph N. Marzin, Potomac Falls, VA (US)

(73) Assignee: CommScope Technologies LLC, Hickory, NC (US)

( * ) Notice: Subject to any disclaimer, the term of this patent is extended or adjusted under 35 U.S.C. 154(b) by 37 days.

(21) Appl. No.: 16/636,595

(22) PCT Filed: Jun. 5, 2018

(86) PCT No.: PCT/US2018/035982
§ 371 (c)(1),
(2) Date: Feb. 4, 2020

(87) PCT Pub. No.: WO2019/032174
PCT Pub. Date: Feb. 14, 2019

(65) Prior Publication Data
US 2020/0389799 A1    Dec. 10, 2020

Related U.S. Application Data

(60) Provisional application No. 62/542,847, filed on Aug. 9, 2017.

(51) Int. Cl.
*H04W 16/18*   (2009.01)
*H04B 17/345*  (2015.01)
(Continued)

(52) U.S. Cl.
CPC .......... *H04W 16/18* (2013.01); *H04B 17/345* (2015.01); *H04W 24/08* (2013.01); *H04W 72/082* (2013.01)

(58) Field of Classification Search
None
See application file for complete search history.

(56) References Cited

U.S. PATENT DOCUMENTS 5,410,737 A * 4/1995 Jones ................. H04B 1/38
                                                  455/454
5,497,503 A * 3/1996 Rydberg ............ H04B 7/2621
                                                  455/454

(Continued)

FOREIGN PATENT DOCUMENTS

| CN | 102870447 B | 1/2016 |
| WO | 2013116557 A1 | 8/2013 |
| WO | 2014023351 A1 | 2/2014 |

OTHER PUBLICATIONS

International Searching Authority, "International Search Report and Written Opinion from PCT Application No. PCT/US2018/035982", dated Sep. 19, 2018, pp. 1-13, Published: WO.

*Primary Examiner* — Diane L Lo
(74) *Attorney, Agent, or Firm* — Fogg & Powers LLC

(57) ABSTRACT

A method is provided. The method comprises receiving design criteria for a fixed microwave network; identifying proximate interfering signals; determining whether interference levels satisfy design criteria of the fixed microwave network; and if the interference levels do not satisfy the design criteria, then optimize operating parameters of radio systems of the fixed microwave network.

14 Claims, 5 Drawing Sheets

(51) Int. Cl.
*H04W 24/08* (2009.01)
*H04W 72/08* (2009.01)

(56) References Cited

U.S. PATENT DOCUMENTS

| | | | |
|---|---|---|---|
| 5,548,809 A * | 8/1996 | Lemson | H04B 7/0837 370/280 |
| 5,752,164 A * | 5/1998 | Jones | H04B 1/38 379/29.01 |
| 6,694,141 B1 | 2/2004 | Pulkkinen et al. | |
| 7,269,151 B2 | 9/2007 | Diener et al. | |
| 9,435,882 B2 | 9/2016 | Martone et al. | |
| 2004/0137915 A1 | 7/2004 | Diener et al. | |
| 2011/0250915 A1 | 10/2011 | Stanforth et al. | |
| 2011/0287802 A1 | 11/2011 | Ma et al. | |
| 2013/0100869 A1* | 4/2013 | Boch | H01Q 1/42 370/310 |
| 2014/0038631 A1* | 2/2014 | Kruglick | H04W 40/16 455/452.2 |
| 2015/0230105 A1 | 8/2015 | Negus et al. | |
| 2017/0251495 A1* | 8/2017 | Webb | H04W 52/0216 |
| 2019/0124554 A1* | 4/2019 | Xiong | H04W 76/22 |

* cited by examiner

METHOD AND SYSTEM FOR PLANNING AND OPERATING FIXED MICROWAVE COMMUNICATIONS SYSTEMS

CROSS-REFERENCE TO RELATED APPLICATIONS

The present application is a U.S. National Stage of PCT Application No. PCT/US2018/035982, filed on Jun. 6, 2018, which claims benefit of U.S. Patent Application Ser. No. 62/542,847, filed Aug. 9, 2017; the entire contents of both of the aforementioned patent applications are incorporated herein by reference as in their entirety.

BACKGROUND

Deployment of optical fiber communications systems has become more prevalent during recent decades. However, the cost and time to deploy optical fiber communications systems is greater than for fixed microwave communications systems. Further, fixed microwave communications systems have lower latency then optical fiber communications systems which is desirable in some applications. Fixed microwave communications systems permit transmission between two fixed points having radio systems that communicate in the microwave and/or millimeter wave bands.

However, congestion in the spectrum utilized by fixed microwave communications systems has increased. Therefore, it has become more challenging for designers to plan new fixed microwave communications systems, and for operators of existing fixed microwave communications systems to efficiently operate (e.g. maintain high data rate communications). Therefore, there is a need for a system to assist designers and operations to implement and manage fixed microwave communications systems.

SUMMARY OF THE INVENTION

A method is provided. The method comprises receiving design criteria for a fixed microwave network; identifying proximate interfering signals; determining whether interference levels satisfy design criteria of the fixed microwave network; and if the interference levels do not satisfy the design criteria, then optimize operating parameters of radio systems of the fixed microwave network.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
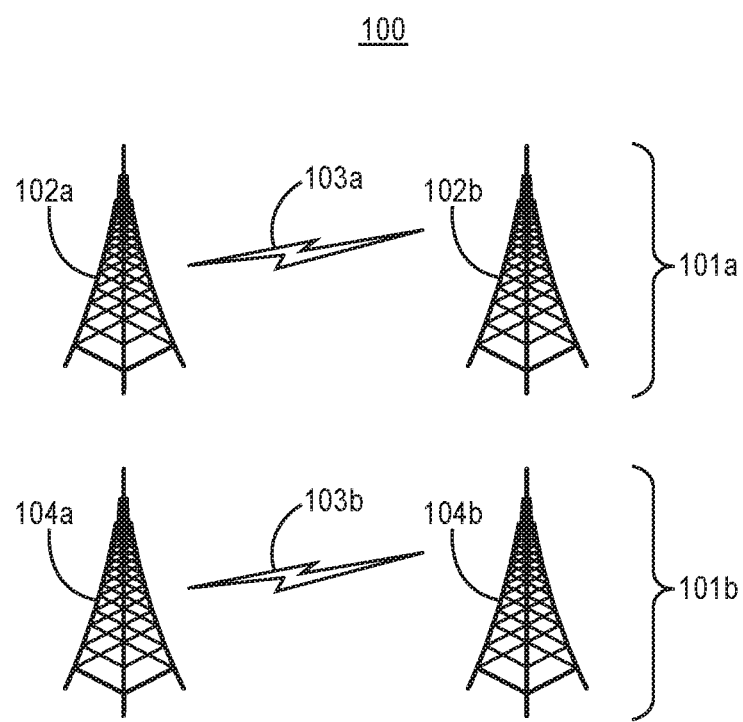
FIG. 1 illustrates one embodiment of two fixed microwave networks.

FIG. 1 illustrates one embodiment of two fixed microwave networks 100. The term fixed microwave network means a network formed by at least two radio systems at fixed locations and which provide backhaul communications as part of a larger network. A first fixed microwave network 101a is comprised of a first radio system 102a and a second radio system 102b that form a first communications link (first link) 103a. A second fixed microwave network 101b is comprised of a third radio system 104a and a fourth radio system 104b that form a second communications link (second link) 103b. The first radio system 102a and the third radio system 104a may have distinct locations or may be co-located, e.g. at and/or on the same tower. Similarly, the second radio system 102b and the fourth radio system 104b may have distinct locations or may be co-located, e.g. at and/or on the same tower. However, the first communications link 103a and/or the second communications link 103b are proximate to the radio systems respectively of the second microwave network 101b and/or the first microwave network 101a. As a result, one microwave network may cause interference to the other microwave network and degrade its performance, such as the rate at which it can communicate data.

Prior to installation of a proposed fixed microwave network, it is desirable to evaluate whether interference levels, at each radio system of a proposed fixed microwave network, satisfy interference criteria of each radio system; if the interference levels do not satisfy, e.g. exceed such interference criteria, then radio system operating parameters are adjusted, e.g. optimized, to so that the interference levels satisfy the interference criteria, e.g. carrier to interference ratio. Criteria as used herein may mean one or more criterion. When the proposed fixed microwave network is being installed, it is also desirable to again verify whether interference levels, at each radio system of the fixed microwave network undergoing installation, satisfy interference criteria of each radio system; if the interference levels do not satisfy the interference criteria then radio system operating parameters are adjusted, e.g. optimized. Further, upon installation, or after deployment upon detection of poor network performance, it is desirable to verify that link availability of a fixed microwave network satisfies corresponding link availability design criteria; if the link availability design criteria are not satisfied, then radio system operating parameters are adjusted, e.g. optimized. Poor performance occurs upon not meeting link availability criteria, minimum fade margin criteria, and/or a minimum receiver sensitivity degradation criteria.

Figure 2:
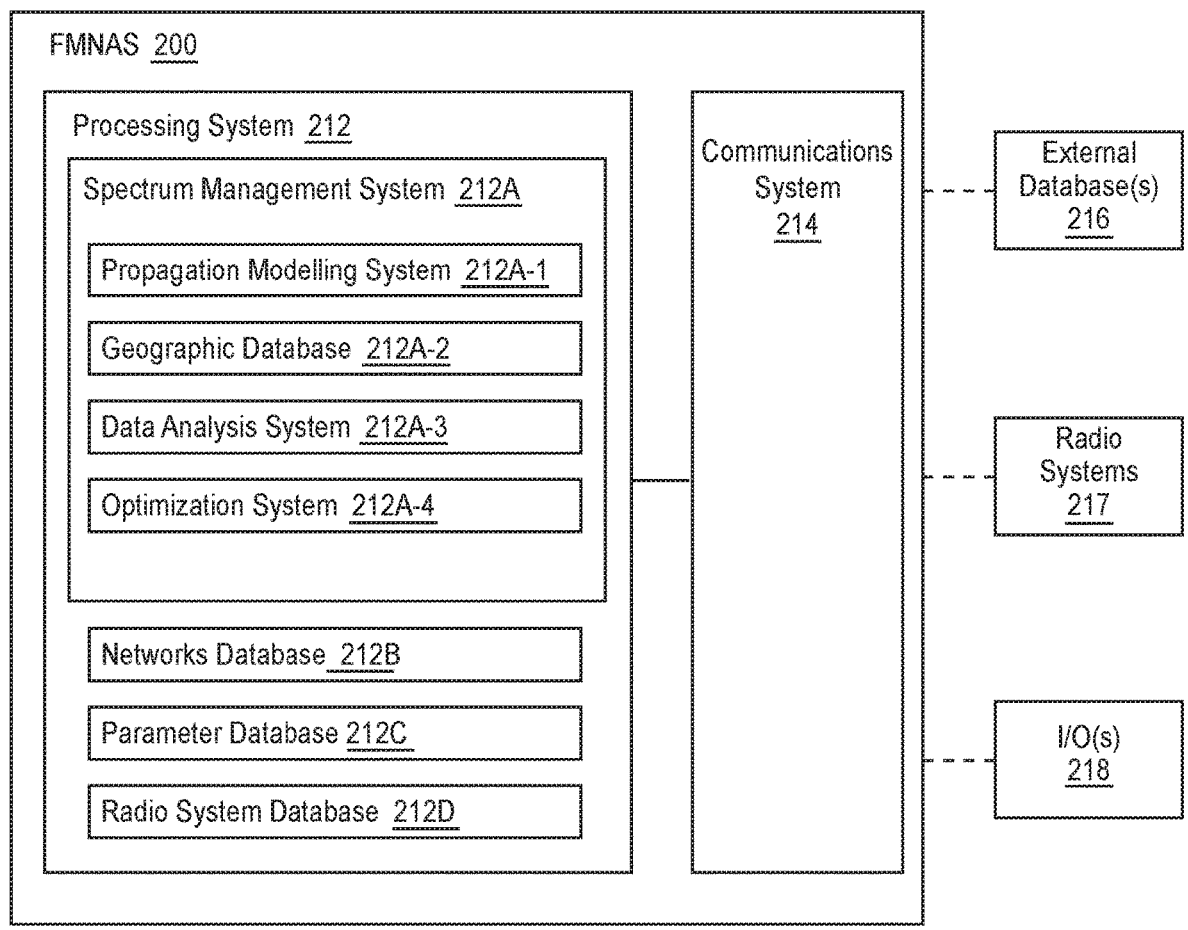
FIG. 2 illustrates one embodiment of a fixed microwave network analysis system.

FIG. 2 illustrates one embodiment of a fixed microwave network analysis system (FMNAS) 200. The FMNAS 200 comprises a processing system 212 coupled to a communications system 214. The communications system 214 comprises circuitry and/or software that facilitate communications between the processing system 212 and other components. In another embodiment, the communications system 214 includes a data modem to facilitate communications between the processing system 212 and other systems coupled with wide area network(s), such as the Internet and/or a private network. In a further embodiment, the communications system 214 facilitates communications between the FMNAS 200 and computers and/or terminals utilized by network designers and/or installers.

In one embodiment, the communications system 214 may include universal serial bus(es) (USB) and/or an Ethernet port(s) and media access controller(s) (MAC(s)) to facilitate respectively personal area networks and/or local area networks. The components, communicatively coupled to the FMNAS 200, may include, for example, at least one external database (external database(s)) 216, at least two radio systems (radio systems) 217, and/or at least one input/output device (I/O(s)) 218.

In one embodiment, the FMNAS 200 is coupled, e.g. using the data modem, to external database(s) 216 stored on external processing systems such as computer servers. In another embodiment, one such external database is a governmental database, e.g. operated by the U.S. Federal Communications Commission (FCC), that stores data about existing fixed microwave networks and/or other communications systems that operate in or adjacent to the spectrum of fixed microwave networks, e.g. including operating frequencies, power levels, modulation types, radio system locations, and/or times of operation. Such external database(s) can be used to locate, identify, and confirm measurement data from radio systems, e.g. that are sources of interference. In a further embodiment, at least one of the external database(s) 216 is a database created by a designer of a fixed microwave network or a fixed microwave network design system that stores design criteria of fixed microwave network(s), e.g. as subsequently illustrated.

In one embodiment, the FMNAS 200 is coupled, e.g. using the data modem, to radio system(s) 217 of fixed microwave networks and/or other communications systems that operate in or adjacent to the spectrum of fixed microwave networks. The radio system(s) 217 may include a radio system that is being installed and/or previously deployed radio systems from which measurement data is being collected by the FMNAS 200.

In one embodiment, the FMNAS 200 is coupled, e.g. using the USB and/or an Ethernet port and MAC, to I/O(s) 218. The I/O(s) 218 may include a display (such as a touch screen), a keyboard, and/or a cursor control device (such as a mouse or joystick).

In one embodiment, the processing system 212 is implemented by a state machine. For example, the state machine may be implemented by a combination of processor(s), e.g. a central processing unit(s) and/or digital signal processor(s), coupled to memory. The memory may, for example, include random access memory, read only memory, flash memory, and/or magnetic memory.

In one embodiment, the processing system 212 includes a spectrum management system (SMS) 212A, a networks database 212B, a parameter database 212C, and a radio system database 212D. The SMS 212A is used to validate the feasibility of a proposed fixed microwave network, and/or optimize the installation and/or operation of fixed microwave network(s). The other components in the processing system 212 facilitate these endeavors.

The networks database 212B stores data about radio systems comprising fixed microwave network(s), e.g. in a specific geographical region such as a state, country, continent (or sub-set thereof). Such data may include data about the receiver, transmitter and antenna for each radio system such as model type and/or operating specifications such as operating band, sensitivity, transmit power level, out of band power levels, modulation types and/or data rates, and/or radiation pattern (e.g. including gain, radiation polarization and angle). The data may include data about the fixed microwave network such as data rate ranges, minimum data rate, and/or minimum link availability criteria. In one embodiment, data stored in the networks database 212B is obtained from, at least in part, one of the external database(s) 216.

The parameter database 212C stores data calculated by the spectrum management system 212A, e.g. by a propagation modelling system 212A-1, a data analysis system 212A-3, and/or an optimization system 212A-4. Such calculated data will be subsequently further described. The parameter database also stores design criteria for a proposed fixed microwave network and the radio systems therein.

The radio system database 212D includes models of different types of transmitters, receivers and/or antennas used to construct radio systems of a proposed or actual fixed microwave network. In one embodiment, transmitter operating band, maximum power level within such operating band, modulation types and/or data rates, and relative out of band power levels are provided in the transmitter models. In another embodiment, receiver operating band and sensitivity within such operating band (including modulation shift thresholds at which data rates are increased or decreased) are provided in the receiver models. In a further embodiment, radiation patterns (including gain, radiation polarization, and/or radiation angle) are provided in the antenna models.

The spectrum management system 212A includes a propagation modelling system 212A-1, a geographic database 212A-2, a data analysis system 212A-3, and an optimization system 212A-4. The propagation modelling system 212A-1 estimates electromagnetic energy radiated by radio systems of a proposed fixed microwave network; for example the propagation modelling system 212A-1 estimates electromagnetic energy at radio systems other then the radio system emanating the electromagnetic energy. In one embodiment, the modelling is based upon data stored or generated by the network database 212B, the parameter database 212C, the radio system database 212D, and/or the data analysis system 212A-3. For example, data from the radio system database 212D may be selected based on information about a radio system (e.g. transmitter, receiver, and/or antenna) specified in one of external database(s) 216.

The propagation modelling system 212A-1 includes one or more RF propagation models, which describe path loss, over geographic region, of a combination of a transmitter and antenna(s) for different propagation conditions. The selection of a propagation model depends upon frequency spectrum, the propagation path (e.g. including distance, geographical terrain, and physical obstructions such as buildings), antenna characteristics (e.g. angle of radiation and radiation polarization), potential atmospheric conditions (e.g. tropospheric conditions such as precipitation, temperature, barometric pressure and water vapor), and/or time (such as time of day and/or solar cycle). The propagation models may be public and/or proprietary models. Examples of propagation models include, but are not limited to, an International Telecommunications Union (ITU)-R P.452 model, a terrain integrated rough Earth model (TIREM), a U.S. National Bureau of Standards Technical Note 101 model, and a Longley-Rice model, and variations and combinations thereof. In one embodiment, the propagation modelling system 212A-1 utilizes terrain models and clutter models found in the first geographic database 212A-2 and corresponding to the geographic region where propagation is modelled. Models as used herein refer to mathematical models, e.g. used to simulate respectively transmitters, receivers, antennas and propagation. Databases as used herein may be either conventional databases or data storage formats of any type, e.g. data files. Although separate databases are recited herein, one or more of such databases may be combined.

In one embodiment, the propagation modelling system 212A-1 generates, e.g. tropospheric propagation loss values between two antennas whose locations are defined by the latitude, longitude and height above mean sea level. In another embodiment, such propagation loss values are stored in the parameter database 212C.

The data analysis system 212A-3 stores measured data obtained from radio system(s) 217, and may store modelled data, e.g. generated by the propagation modelling system 212A-1, and/or measured data. The data analysis system 212A-3 also analyzes measured and/or modelled data.

In one embodiment, the data analysis system 212A-3 also stores information about the recorded data, and analyzes recorded and measured data. Recorded data is data about diminished performance events of fixed microwave communication network links, such as an outage (e.g. loss of signal), bit error rate, and severely errored seconds. The recorded data is provided to the FMNAS 200 by the radio systems 217. In another embodiment, the data analysis system 212A-3 performs data analysis, e.g. data mining, of measured and recorded data to correlate such diminished performance events with operational characteristics of the radio systems 217. For example, transmission by one radio system may cause diminished performance events in another radio system.

In one embodiment, the data analysis system 212A-3 controls fade margin testing of radio systems, stores the corresponding measured data, determines link availability of a fixed microwave network, and determines whether the calculated link availability equals or exceeds the minimum link availability criteria. Link availability is a percentage of time that communications will be uninterrupted, for example, due to loss of communications due to fading.

In one embodiment, the data analysis system 212A-3 also ascertains whether interference levels at a radio system of a fixed microwave network satisfy the desired interference criteria, e.g. a minimum carrier to interference ratio. For example, when ascertaining the feasibility of a proposed fixed microwave network, the propagation modelling system 212A-1, utilizing the geographic database 212A-2 and design criteria for the proposed fixed microwave network, estimates the carrier signal levels of first and second radio systems received respectively by the second and first radio system. Based upon measured and/or modelled signals from existing fixed microwave networks at the location of each radio system of the proposed fixed microwave system, the data analysis system 212A-3 calculates a corresponding carrier to interference ratios and ascertains if the ratios satisfy, e.g. exceed, the carrier to interference criteria for the corresponding radio systems.

The optimization system 212A-4 optimizes parameters of radio systems of a fixed microwave network being installed and/or operated. For example, if the interference levels and/or link availability do not satisfy corresponding design criteria (for example the carrier to interference levels and/or the link availability are below the corresponding design criteria), then the optimization system 212A-4 determines radio system operating parameters, such as transmitter power level(s), frequenc(ies) of operation, modulation type and/or maximum data rate, and/or antenna polarization(s), that result in the interference levels and/or link availability that satisfy such design criteria for those systems. The optimization system 212A-4 may use modeled and/or measured data stored in the processing system 212; the measured data includes received signal strength of signals intentionally sent to the radio system being evaluated, and interference levels of undesired signals sent from other radio system(s). Further, the optimization system 212A-4 obtains interference levels from the radio systems of the fixed microwave network being analyzed. Thus, the optimization system 212A-4 may calculate interference levels, e.g. carrier to interference ratios. Alternatively, the optimization system 212A-4 obtains interference characteristics, e.g. carrier to interference ratio, from the radio systems of the fixed microwave network being analyzed. In one embodiment, the optimization system 212A-4 obtains values for interference levels, e.g. carrier to interference ratios, that satisfy corresponding design parameters by optimizing radio system operating parameters, such as transmitter power level(s), frequenc(ies) of operation, modulation type and/or maximum data rate, and/or antenna polarization(s), using Lagrange multipliers or other optimization techniques.

Figure 3:
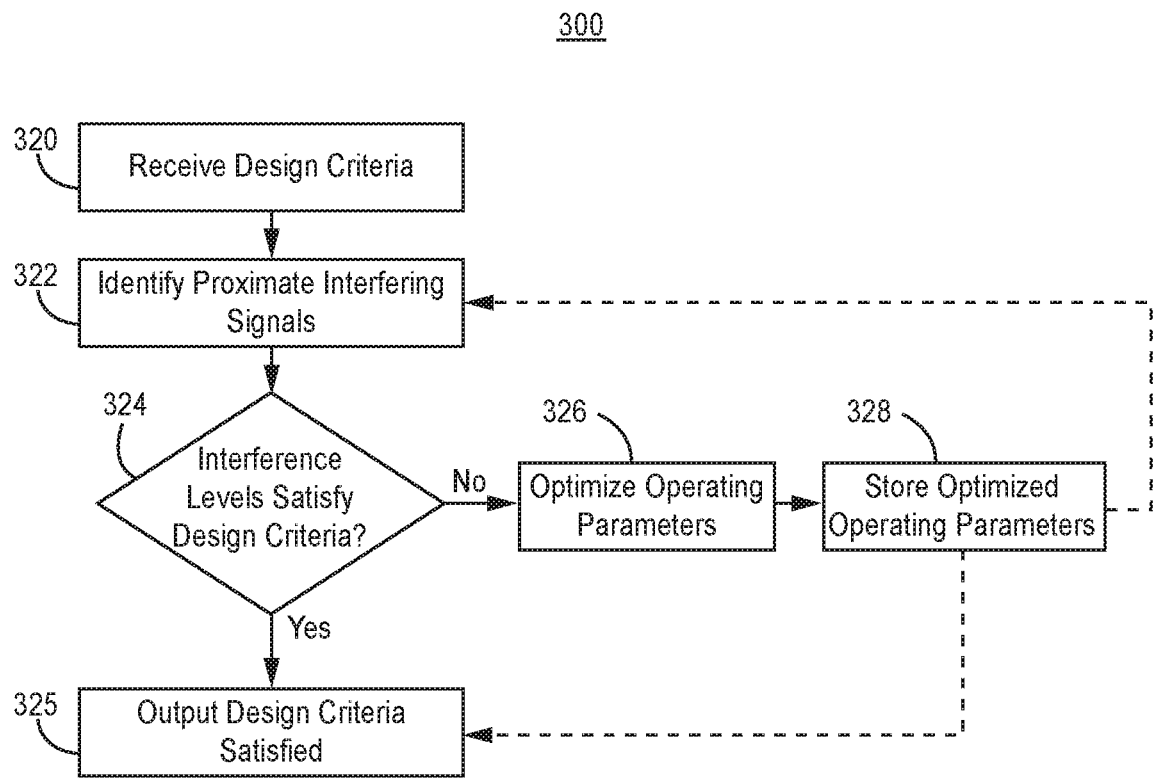
FIG. 3 illustrates one embodiment of a method of determining feasibility of a fixed microwave network.

FIG. 3 illustrates one embodiment of a method of determining feasibility of a fixed microwave network 300. To the extent the method 300 shown in FIG. 3 is described herein as being implemented in the systems shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

The method of determining feasibility is performed to confirm design criteria of a proposed fixed microwave network. In block 320, receive such design criteria, e.g. supplied by one of the external database(s) 216 or entered using the I/O(s) 218, e.g. by a design tool or entered by a system designer.

In block 322, identify any proximate interfering signals from communications links or broadcast transmitters, e.g. from other fixed microwave networks and/or any other communications networks, e.g. using the networks database 212B. Proximate interfering signals would be signals having a power level above minimum criteria at a location of a radio system being analyzed. The minimum criteria for each proximate interfering signal can be lower than a power level that would cause the interference criteria to not satisfy specified criteria. This is because the power levels of more than one signal can be combined, e.g. taking into account the interference power aggregation of the different signals, to achieve the power level that would cause the interference criteria not to be satisfied. In one embodiment, the networks database 212B may first communicate with the external database(s) 216 to obtain information about new fixed microwave networks about which it is unaware, and then update the networks database 212B. Proximate interfering signals may be ascertained by using modelled and/or measured data. Modelled data is generated using the propagation modelling system 212A-1 and geographic database 212A-2 using corresponding data in the networks database 212B. In another embodiment, the generated modelled data is stored in the parameter database 212C.

In block 324, determine, e.g. with the data analysis system 212A-3, if the interference levels, e.g. carrier to interference ratios, satisfies, e.g. exceeds, the proposed design criteria of the radio systems of the proposed fixed microwave network. In one embodiment, if the interference ratio satisfies the design criteria, then, in block 325, output that that the interference design criteria has been satisfied, e.g. to a user or system requesting such information for example using the I/O(s) 218.

If the interference level does not satisfy the design criteria, then, in block 326, optimize radio system operating parameters, e.g. transmitter power level, frequency of operation, modulation type and/or maximum data rate, and polarization, of the radio systems of the radio network whose feasibility is being ascertained. In one embodiment, perform the optimization using the optimization system 212A-4. In another embodiment, in block 328 store the optimized parameters, e.g. in the parameter database 212C. Then, in a further embodiment, return to block 322. Alternatively, proceed to block 325.

Figure 4:
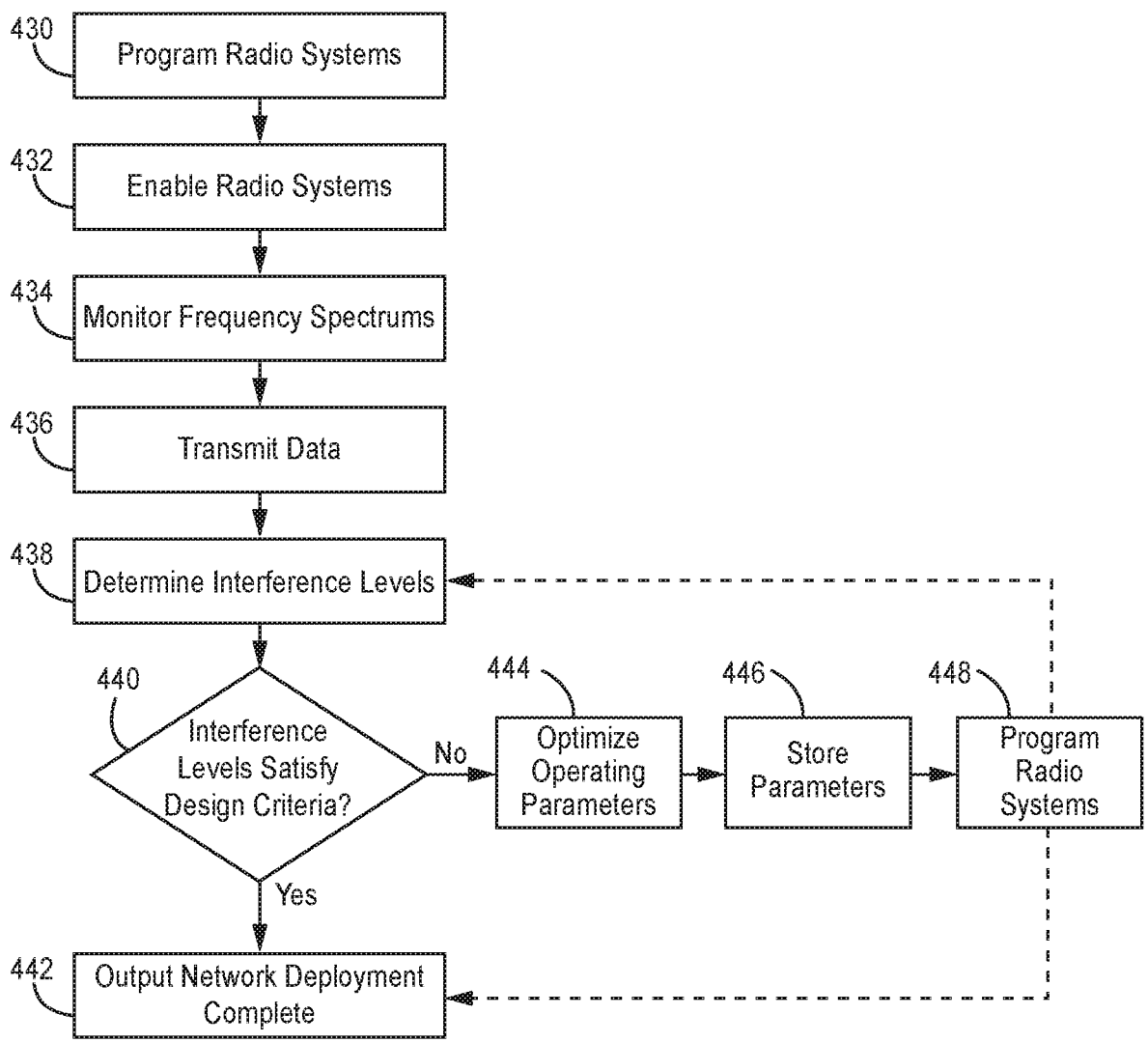
FIG. 4 illustrates one embodiment of a method of evaluating and optimizing an installation of a fixed microwave network.

FIG. 4 illustrates one embodiment of a method of evaluating and optimizing an installation of a fixed microwave network 400. To the extent the method 400 shown in FIG. 4 is described herein as being implemented in the systems shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

The method of determining feasibility of an installation is performed to confirm proper operation of the fixed microwave network being installed. In block 430, program radio systems, of a fixed microwave network, e.g. with radio system operating parameters, e.g. transmitter power level, frequency of operation, modulation type and/or maximum data rate, and antenna polarization. In one embodiment, perform such programming with the data analysis system 212A-3. In block 432, e.g. with the data analysis system 212A-3, enable operation of the radio systems of the fixed microwave network.

In block 434, monitor a frequency spectrum, including the frequency spectrum adjacent to the spectrum in which the fixed microwave network being installed is designed to operate. In one embodiment, monitor the frequency spectrum with the radio systems of the fixed microwave network being installed. In another embodiment, store data associated with monitored data, e.g. maximum signal strength by frequency or frequency band, in the data analysis system 212A-3.

In block 436, transmit data, e.g. test data, between the radio systems comprising the fixed microwave network being installed. In block 438, determine, e.g. with the data analysis system 212A-3, interference levels at the operating frequencies of the radio systems. In block 440, determine whether interference levels satisfy the design criteria of the radio systems, e.g. with the data analysis system 212A-3. In one embodiment, determining whether the interference levels satisfies the design criteria comprises satisfying carrier to interference criteria and/or link availability criteria, e.g. in the presence of interference.

If the interference levels satisfy the design criteria, then in block 442, output that the fixed microwave network deployment is complete e.g. to an installer of the fixed microwave network being installed for example using the I/O(s) 218.

If the interference levels do not satisfy the design criteria, then in block 444 optimize, as described above, radio system operating parameters of the fixed microwave network being installed. In one embodiment, in block 446, store corresponding updated parameters, e.g. in the parameter database 212C. In block 448, program the updated parameters into the radio systems of the fixed microwave network being installed. In one embodiment return to block 442. Alternatively, in another embodiment, proceed to block 438.

Figure 5:
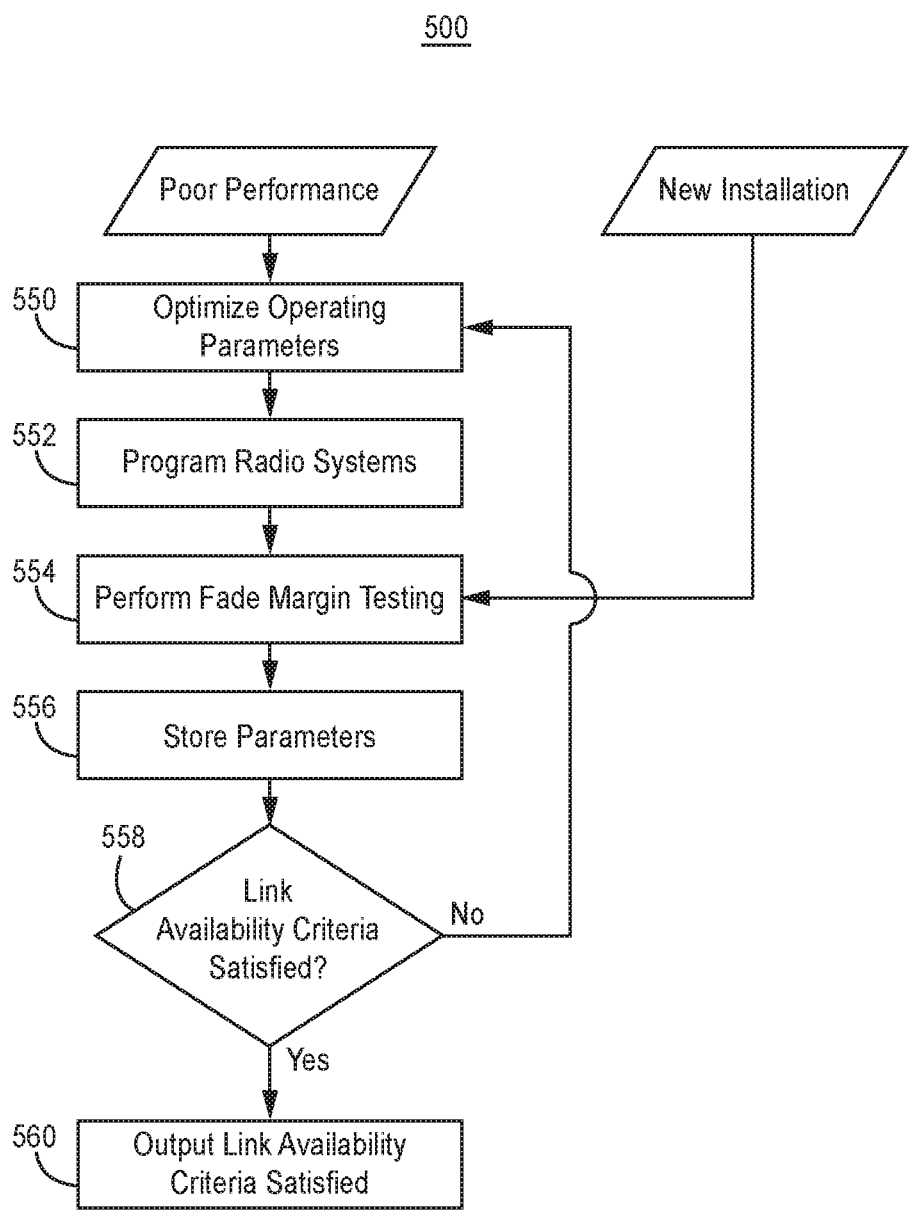
FIG. 5 illustrates one embodiment of a method of evaluating link availability of a fixed microwave network.

FIG. 5 illustrates one embodiment of a method of evaluating link availability of a fixed microwave network 500. To the extent the method 500 shown in FIG. 5 is described herein as being implemented in the systems shown in FIGS. 1 and 2, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

Upon installation, or after deployment upon detection of poor network performance, link availability of the corresponding fixed microwave network is evaluated to determine if each network link satisfies corresponding link availability design criteria. In block 550, e.g. if poor performance of a fixed microwave system is detected, optimize, as described above, radio systems operating parameters of the fixed microwave network. In one embodiment, such optimization includes performing data analysis, e.g. data mining, (of measured and recorded data to correlate diminished performance events with operational characteristics of the radio systems) and using the data analysis results to determine the optimized radio systems operating parameters.

In block 552, program radio systems, of a fixed microwave network with radio system operating parameters, e.g. transmitter power level, frequency of operation, modulation type and/or maximum data rate, and antenna polarization. In one embodiment, perform such programming with the data analysis system 212A-3.

In block 554, perform fade margin testing for one or more transmission data rates, e.g. by transmitting attenuated signals from each radio system in the fixed microwave network and generating parameter(s) characterizing quality of the corresponding received signals at other radio system(s) in the fixed microwave network. In one embodiment, the quality of the signals is characterized by the extent the transmitted signal is received, e.g. for digital transmissions a bit error rate. In another embodiment, attenuate the transmitted signal by one to fifty decibels, e.g. with variable attenuators at the output of the transmitter of the corresponding radio system or by reducing amplification gain in the transmitter. In a further embodiment, if a new installation is being evaluated, commence with block 554.

In one embodiment, in block 556, store, e.g. in the data analysis system 212A-3, the parameter(s) characterizing the quality. In block 558, determine if the parameter(s) satisfy corresponding link availability design criteria, e.g. with respect to each data rate. The link availability design criteria correspond to parameter(s), e.g. minimum bit error rate or signal to noise ratio, necessary to maintain a certain level of link availability. In another embodiment, the link availability criteria are stored with other design parameters in the parameters database 212C. Link availability is the percentage of time during a period that the communications is uninterrupted and/or transmits data error free.

If link availability criteria are satisfied, then in block 560, output that the link availability criteria are satisfied, e.g. to an installer of the fixed microwave network being installed (for example using the I/O(s) 218). If the link availability is not satisfied, then return to block 550. In one embodiment, limit the number of times that operating parameters are optimized to N times, e.g. where N equals ten; if the link availability criteria are not satisfied after the Nth failure to satisfy the link availability criteria, then output that the link availability criteria cannot be satisfied, e.g. to the installer.

EXAMPLE EMBODIMENTS

Example 1 includes a system, comprising: processing system, comprising: a spectrum management system; a networks database; a parameter database; and a radio system database; a communications system coupled to the processing system; wherein the system is configured to be coupled to at least two radio systems; and wherein the spectrum management system is configured to perform at least one of: evaluating whether interference levels, at each radio system of a proposed fixed microwave network, satisfy interference criteria of that radio system; verifying whether interference levels, at each radio system of a fixed microwave network being installed, satisfy interference criteria of that radio system; and upon installation, or after deployment and upon detection of poor network performance, verifying that link availability criteria of a fixed microwave network are satisfied.

Example 2 includes the system of Example 1, wherein the spectrum management system comprises: a propagation modelling system; a geographic database; a data analysis system; and an optimization system.

Example 3 includes the system of any of Examples 1-2, wherein the system is configured to be coupled to at least one external database.

Example 4 includes the system of Example 3, wherein one of the at least one external database comprises at least one of: (a) a database that stores data about at least one of: fixed microwave networks and other communications systems, and (b) a database that stores design criteria of fixed microwave network(s).

Example 5 includes a method, comprising: receiving design criteria for a fixed microwave network; identifying proximate interfering signals; determining whether interference levels satisfy design criteria of the fixed microwave network; and if the interference levels do not satisfy the design criteria, then optimize operating parameters of radio systems of the fixed microwave network.

Example 6 includes the method of Example 5, further comprising if the interference levels satisfy the design criteria, then outputting that the design criteria has been satisfied.

Example 7 includes the method of any of Examples 5-6, wherein determining whether the interference levels satisfy the design criteria comprises determining whether the interference levels satisfy carrier to interference criteria.

Example 8 includes a method, comprising: programming radio systems of a fixed microwave network; enabling the radio systems; monitoring frequency spectrum; transmitting data from the radio systems; determining interference levels; determining whether interference levels satisfy design criteria of the fixed microwave network; and if the interference levels do not satisfy the design criteria of the fixed microwave network, then: optimizing the operating parameters of the radio systems; and programming the radio systems with the optimized operating parameters.

Example 9 includes the method of Example 8, wherein the determining whether the interference levels satisfy design criteria comprises determining whether the interference levels satisfies at least one of: carrier to interference criteria and link availability criteria.

Example 10 includes the method of any of Examples 8-9, wherein if the interference levels satisfy the design criteria, then outputting that the network deployment is complete.

Example 11 includes a method, comprising: performing fade margin testing of radio systems of a fixed microwave network; determining if link availability criteria of each radio system is satisfied; and if the link availability criteria for each radio system is not satisfied, then: optimizing operating parameters of each radio system that does not satisfy the link availability criteria; and programming each radio system that does not satisfy the link availability criteria with the optimized parameter.

Example 12 includes the method of Example 11, wherein the fade margin testing comprises determining at least one parameter characterizing a quality of signals received by each radio system.

Example 13 includes the method of Example 12, wherein the determining at least one parameter characterizing the quality of the signals received by each radio system comprises determining a bit error rate for the signals received by each radio system.

Example 14 includes the method of any of Examples 11-13, wherein if the link availability criteria for each radio system is satisfied, then outputting that the link availability criteria is satisfied.

Example 15 includes the method of any of Examples 11-14, wherein optimizing operating parameters comprises performing data analysis of measured and recorded data to correlate diminished performance events with operational characteristics of radio systems.

Example 16 includes a non-transitory computer readable medium storing a program causing a computer to execute a process, the process comprising: receiving design criteria for a fixed microwave network; identifying proximate interfering signals; determining whether interference levels satisfy design criteria of the fixed microwave network; and if the interference levels do not satisfy the design criteria, then optimizing operating parameters of radio systems of the fixed microwave network.

Example 17 includes the non-transitory computer readable medium of Example 16, wherein determining whether the interference levels satisfy the design criteria comprises determining whether the interference levels satisfy carrier to interference criteria.

Example 18 includes a non-transitory computer readable medium storing a program causing a computer to execute a process, the process comprising: programming radio systems of a fixed microwave network; enabling the radio systems; monitoring frequency spectrum; transmitting data from the radio systems; determining interference levels; determining whether interference levels satisfy design criteria of the fixed microwave network; and if the interference levels do not satisfy the design criteria of the fixed microwave network, then: optimizing the operating parameters of the radio systems; and programming the radio systems with the optimized operating parameters.

Example 19 includes the non-transitory computer readable medium of Example 18, wherein the determining whether the interference levels satisfy design criteria comprises determining whether the interference levels satisfies at least one of: carrier to interference criteria and link availability criteria.

Example 20 includes a non-transitory computer readable medium storing a program causing a computer to execute a process, the process comprising: performing fade margin testing of radio systems of a fixed microwave network; determining if link availability criteria of each radio system is satisfied; and if the link availability criteria for each radio system is not satisfied, then: optimizing operating parameters of each radio system that does not satisfy the link availability criteria; and programming each radio system that does not satisfy the link availability criteria with the optimized parameter.

Example 21 includes the non-transitory computer readable medium of Example 20, wherein the fade margin testing comprises determining at least one parameter characterizing a quality of signals received by each radio system.

Example 22 includes the non-transitory computer readable medium of any of Examples 20-21, wherein optimizing operating parameters comprises performing data analysis of measured and recorded data to correlate diminished performance events with operational characteristics of radio systems.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims. For example, a signal may be a voltage signal or a current signal.

The invention claimed is:

1. A system, comprising:
   processing circuitry, comprising:
   a spectrum management system;
   a networks database;
   a parameter database; and
   a radio system database;
   a communications system coupled to the processing circuitry;
   wherein the system is configured to be coupled to at least two radio systems;
   wherein the processing circuitry is configured to:
      identify any interfering signals based upon measured data, where the identified interfering signals having a power level above minimum criteria at a location of a radio system of a fixed microwave and/or millimeter-wave network;
      evaluate whether interference levels due to the identified interfering signals, at each proposed radio system location of a proposed fixed microwave and/or millimeter-wave network, satisfy interference criteria of that proposed radio system, where the fixed microwave and/or millimeter-wave network is a network formed by the at least two radio systems at fixed locations and which provides backhaul communications as part of a larger network;
      verify whether interference levels, at each radio system of a fixed microwave and/or millimeter-wave network being installed, satisfy interference criteria of that radio system; and
      upon installation, or after deployment and upon detection of poor network performance, verify that link availability criteria of a newly installed fixed microwave and/or millimeter-wave network are satisfied;
      wherein, upon evaluating that the interference levels do not satisfy the interference criteria, then the processing circuitry is further configured to optimize operating parameters of proposed radio systems; and
      wherein, upon either failing to verify that the interference levels satisfy the interference criteria or failing to verify that the link availability criteria is satisfied, the processing circuitry is further configured to optimize the operating parameters of the at least two radio systems, and program the at least two radio systems with the optimized operating parameters.

2. The system of claim 1, wherein the spectrum management system comprises:
   a propagation modelling system;
   a geographic database;
   a data analysis system; and
   an optimization system.

3. The system of claim 1, wherein the system is configured to be coupled to at least one external database.

4. The system of claim 3, wherein one of the at least one external database comprises at least one of: (a) a database that stores data about at least one of: fixed microwave and/or millimeter-wave networks and other communications system(s), and (b) a database that stores design criteria of the fixed microwave and/or millimeter-wave network(s).

5. A method, comprising:
   receiving design criteria for a proposed fixed microwave and/or millimeter-wave network, where a fixed microwave and/or millimeter-wave network is a network formed by at least two radios at fixed locations and which provides backhaul communications as part of a larger network;
   measuring data;
   based upon the measured data, identifying interfering signals having a power level above minimum criteria at a proposed location of a proposed radio of the proposed fixed microwave and/or millimeter-wave network;
   determining whether interference levels, due to the identified interfering signals, satisfy the design criteria of the proposed fixed microwave and/or millimeter-wave network; and
   upon determining that the interference levels do not satisfy the design criteria, then optimizing operating parameters of proposed radios of the proposed fixed microwave and/or millimeter-wave network, and programming the proposed radios, of the fixed microwave and/or millimeter-wave network, to be programmed with the optimized operating parameters.

6. The method of claim 5, further comprising upon determining that the interference levels satisfy the design criteria, then outputting that the design criteria has been satisfied.

7. The method of claim 5, wherein determining whether the interference levels satisfy the design criteria comprises determining whether the interference levels satisfy carrier to interference criteria.

8. A method, comprising:
   programming operating parameter values into radios of a fixed microwave and/or millimeter-wave network, where the fixed microwave and/or millimeter-wave network means a network formed by radios at fixed locations, configured to have a communications link between two radios of the fixed microwave and/or millimeter-wave network, and which provides backhaul communications as part of a larger network;
   enabling the radios of the fixed microwave and/or millimeter-wave network, to operate;
   monitoring, with the radios of the fixed microwave and/or millimeter-wave network, frequency spectrum;
   transmitting data between the radios of the fixed microwave and/or millimeter-wave network;
   using information obtained by monitoring with the radios of the fixed microwave and/or millimeter-wave network, determining interference levels at operating frequencies of the radios of the fixed microwave and/or millimeter-wave network;

determining whether the interference levels satisfy design criteria of the fixed microwave and/or millimeter-wave network; and upon determining that the interference levels do not satisfy the design criteria of the fixed microwave and/or millimeter-wave network, then:
- optimizing the operating parameter values of the radios of the fixed microwave and/or millimeter-wave network; and
- programming the radios, of the fixed microwave and/or millimeter-wave network, with optimized operating parameter values.

9. The method of claim 8, wherein determining whether the interference levels satisfy the design criteria comprises determining whether the interference levels satisfies at least one of: carrier to interference criteria and link availability criteria.

10. The method of claim 8, wherein upon determining that the interference levels satisfy the design criteria, then outputting that network deployment is complete.

11. A non-transitory processor readable medium storing a program causing a processor to execute a process, the process comprising:

receiving design criteria for a fixed microwave and/or millimeter-wave network, where a fixed microwave and/or millimeter-wave network means a network formed by at least two radios at fixed locations and which provides backhaul communications as part of a larger network;

receiving measured data;

based upon the measured data, identifying interfering signals having a power level above minimum criteria at a proposed location of a proposed radio of the fixed microwave and/or millimeter wave network;

determining whether interference levels, due to the identified interfering signals, satisfy the design criteria of the fixed microwave and/or millimeter-wave network; and upon determining that the interference levels do not satisfy the design criteria, then optimizing operating parameters of proposed radios of the fixed microwave and/or millimeter-wave network and causing the proposed radios, of the fixed microwave and/or millimeter-wave network, to be programmed with the optimized operating parameters.

12. The non-transitory processor readable medium of claim 11, wherein determining whether the interference levels satisfy the design criteria comprises determining whether the interference levels satisfy carrier to interference criteria.

13. A non-transitory processor readable medium storing a program causing a processor to execute a process, the process comprising:

sending operating parameter values to be programmed into radios of a fixed microwave and/or millimeter-wave network, where the fixed microwave and/or millimeter-wave network means a network formed by radios at fixed locations, configured to have a communications link between two radios of the fixed microwave and/or millimeter-wave network, and which provides backhaul communications as part of a larger network;

causing operation of the radios, of the fixed microwave and/or millimeter-wave network, to be enabled;

causing monitoring, by the radios of the fixed microwave and/or millimeter-wave network, of frequency spectrum;

causing transmission of data between the radios of the fixed microwave and/or millimeter-wave network;

using information obtained by monitoring by the radios of the fixed microwave and/or millimeter-wave network, determining interference levels at operating frequencies of the radios of the fixed microwave and/or millimeter-wave network;

determining whether the interference levels satisfy design criteria of the fixed microwave and/or millimeter-wave network; and upon determining that the interference levels do not satisfy the design criteria of the fixed microwave and/or millimeter-wave network, then:
- optimizing the operating parameter values of the radios of the fixed microwave and/or millimeter-wave network; and
- programming the radios, of the fixed microwave and/or millimeter-wave network, with the optimized operating parameter values.

14. The non-transitory processor readable medium of claim 13, wherein determining whether the interference levels satisfy the design criteria comprises determining whether the interference levels satisfy at least one of: carrier to interference criteria and link availability criteria.

* * * * *